US008297509B2

(12) United States Patent
Hall, Jr. et al.

(10) Patent No.: US 8,297,509 B2

(45) Date of Patent: Oct. 30, 2012

(54) USER INTERFACE FEEDBACK USING SCANNER LIGHT SOURCE

(75) Inventors: James A. Hall, Jr., Boise, ID (US); Douglas G. Keithley, Boise, ID (US)

(73) Assignee: Marvell International Ltd. (BM)

(*) Notice: Subject to any disclaimer, the term of this patent is extended or adjusted under 35 U.S.C. 154(b) by 530 days.

(21) Appl. No.: 12/541,688

(22) Filed: Aug. 14, 2009

(65) Prior Publication Data

US 2009/0303539 A1 Dec. 10, 2009

Related U.S. Application Data

(63) Continuation-in-part of application No. 11/400,082, filed on Apr. 7, 2006, now Pat. No. 7,798,407.

(60) Provisional application No. 61/091,617, filed on Aug. 25, 2008.

(51) Int. Cl.
*G06K 7/10* (2006.01)

(52) U.S. Cl. ......................... 235/454; 235/406; 235/474

(58) Field of Classification Search .................. 235/454; 358/406, 474, 497
See application file for complete search history.

(56) References Cited

U.S. PATENT DOCUMENTS

| | | | | |
|---|---|---|---|---|
| 6,154,293 | A | 11/2000 | Chieh | |
| 6,369,833 | B1 | 4/2002 | van Liempd et al. | |
| 6,388,778 | B1 | 5/2002 | Ko-Chien | |
| 6,816,154 | B2 | 11/2004 | Wong et al. | |
| 7,156,307 | B2 | 1/2007 | Stadelmann et al. | |
| 7,212,312 | B2 | 5/2007 | Motamed | |
| 7,405,847 | B2 | 7/2008 | Short et al. | |
| 2002/0071141 | A1* | 6/2002 | Katakura et al. | 358/474 |
| 2005/0133602 | A1* | 6/2005 | Stadelmann et al. | 235/469 |
| 2007/0235541 | A1 | 10/2007 | Hall, Jr. et al. | 235/454 |

* cited by examiner

*Primary Examiner* — Ahshik Kim

(57) ABSTRACT

An image forming apparatus includes a scanning region and a user interface region adjacent to the scanning region. In the user interface, a first illuminated indicator corresponds to a function of the image forming apparatus. A light source is operable to illuminate an object in the scanning region. A first light conveying member is coupled to the illuminated indicator and operable to receive light from the light source.

20 Claims, 10 Drawing Sheets

USER INTERFACE FEEDBACK USING SCANNER LIGHT SOURCE

CROSS-REFERENCE TO RELATED APPLICATIONS

This application claims the benefit of U.S. Provisional Application No. 61/091,617, filed Aug. 25, 2008, which is hereby incorporated by reference in its entirety. This application is a continuation-in-part of application Ser. No. 11/400,082 filed Apr. 7, 2006 (now U.S. Pat. No. 7,798,407), which is hereby incorporated by reference in its entirety.

BACKGROUND

Conventional scanning apparatuses typically include a user interface in the form of a control panel with a number of electronic control devices and a small display device so that users can enter commands into the apparatuses. Devices including the combined functions of a scanner, printer, photocopier, and facsimile, referred to as an "All In One" (AIO) device or "Multi-Function Printer" (MFP), typically include a small number of electronic buttons and a small LCD display device. The electronic buttons are used for entering commands, such as "set number of copies", "adjust contrast", "start", "clear," etc. The results of these commands are displayed on the LCD display device. Since LCD display devices can be expensive, cost sensitive products usually include small, ambient-lit, character LCD display devices. Given the cost concerns, what would be desirable is an apparatus and method for displaying information to the user that can reduce the overall cost of the apparatus and decrease the possibility of untimely product failure.

SUMMARY OF THE INVENTION

An image forming apparatus includes a scanning region and a user interface region adjacent to the scanning region. In the user interface, a first illuminated indicator corresponds to a function of the image forming apparatus. A light source is operable to illuminate an object in the scanning region. A first light conveying member is coupled to the illuminated indicator and operable to receive light from the light source.

For example, the object in the scanning region may be an original copy of printed material. When the light source is near the scanning region, the light source scans the object. When the light source is near the user interface, the light source may illuminate the first illuminated indicator. The illuminated indicator identifies a function of the image forming apparatus to the user.

The present invention is defined by the following claims, and nothing in this section should be taken as a limitation on those claims. The preferred embodiments will now be described with reference to the attached drawings.

DETAILED DESCRIPTION

Figure 1:
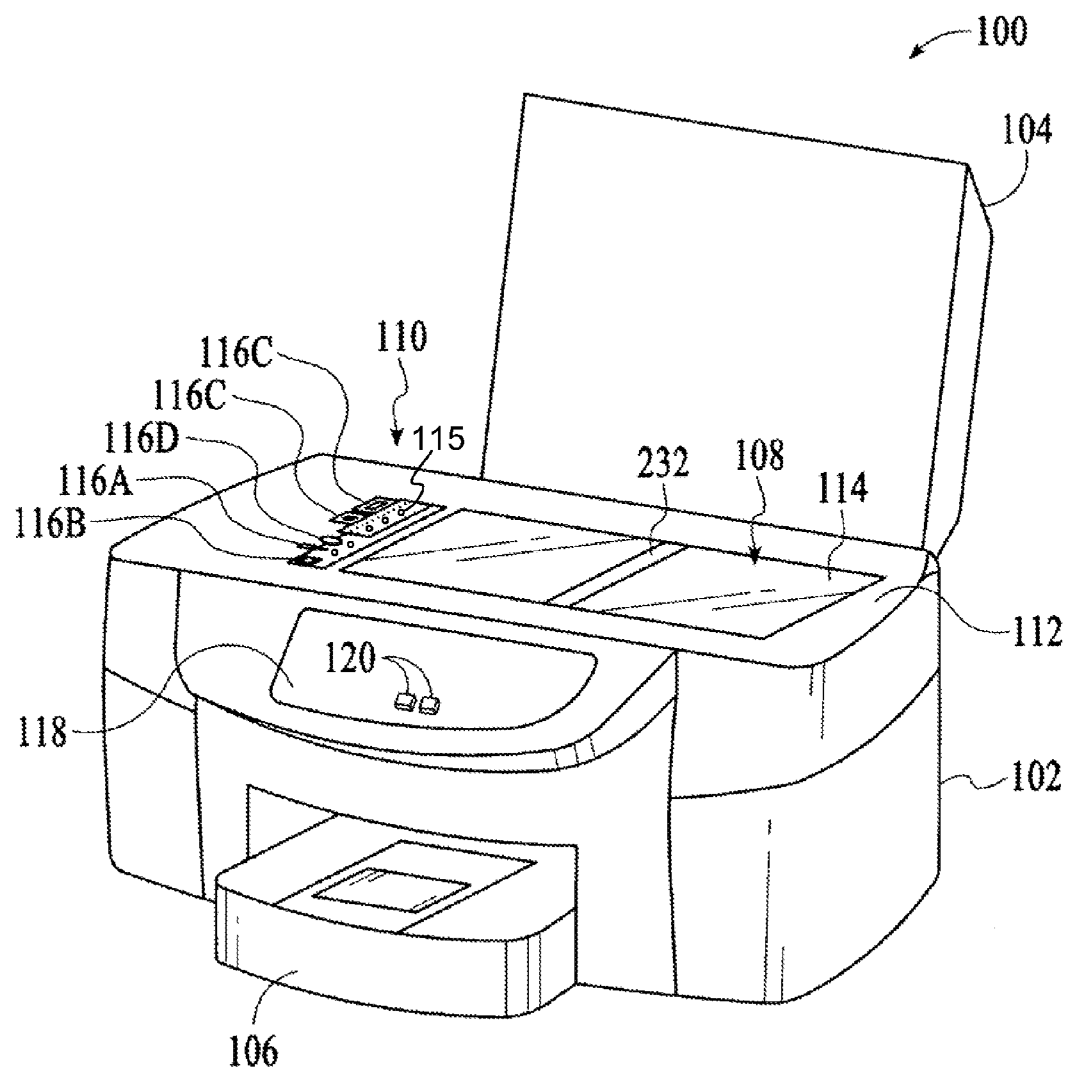
FIG. 1 is a perspective view of an image forming apparatus in accordance an embodiment.

With reference to FIG. 1, an image forming apparatus 100 may be a printer, scanner, photocopier, facsimile, "All In One" (AIO) device, or Multi-Function Printer (MFP). However, in other embodiments, the image forming apparatus 100 may be any type of scanning apparatus, such as a flatbed scanner or handheld scanner. As shown in FIG. 1, the image forming apparatus 100 includes a housing structure 102, a scanner lid 104 and a supply 106 of print media. The housing structure 102 is configured to include a scanning region 108 and a user interface region 110, which are located at the upper surface 112 of the housing structure 102. A transparent panel 114 includes the scanning region 108. In an embodiment, the transparent panel extends under the user interface region 110. As illustrated in FIG. 1, the image forming apparatus 100 includes one or more non-electronic (or non-electrical) control devices 116 and one or more illuminated indicators 115, which are located in the user interface region 110. As described in more detail below, the settings of the non-electronic control devices 116 are optically determined by imaging at least a portion of each non-electronic control device using the scanning capabilities of image forming apparatus 100. Instead of an LCD display, light emitting diodes (LEDs) or another electrically powered indicator, passive indicators 115 convey information to the user. The passive indicators 115 are illuminated by the scanning light source, and may also be referred to as illuminated indicators 115. The scanner that scans the target image may also provide the functions of receiving input from the user via a user interface and outputting information to the user via the user interface. In this way, a single light source may provide one, some, or all of the following three functions: (1) scan the object in the scanning region that is to be copied, printed or otherwise imaged, (2) determine the settings of the non-electronic control devices 116, and (3) illuminate indicators 115 to convey control panel type or display type information to the user.

In contrast to electronic control devices, the non-electronic control devices 116 and illuminated indicators 115 do not include any electronic components, and consequently, can be significantly lower in price than the electronic control devices. U.S. patent application Ser. No. 11/400,082, published as Patent Application Publication No. 2007/0235541 on Oct. 11, 2007, describes a scanning apparatus and method for entering a user input into the apparatus using a non-electrical control device. The non-electronic control devices 116 can significantly reduce the overall cost of the image forming apparatus 100. In addition, since the non-electronic control devices 116 and illuminated indicators 115 do not include any electronic components, these non-electronic control devices are less susceptible to malfunction, which can decrease the possibility of untimely product failure. Furthermore, the illuminated indicators 115 eliminate the need for an electronic display device to display graphical information regarding the settings of the devices.

The image forming apparatus 100 may also include a control panel 118 with one or more conventional electronic control devices 120 and/or conventional indicators. The control panel 118 is attached to the housing structure 102, as shown in FIG. 1. In the illustrated embodiment, the control panel 118 includes two electronic buttons 120. However, in other embodiments, the control panel 118 may include any number of conventional electronic control devices, such as buttons, dials, levers and knobs.

Figure 2:
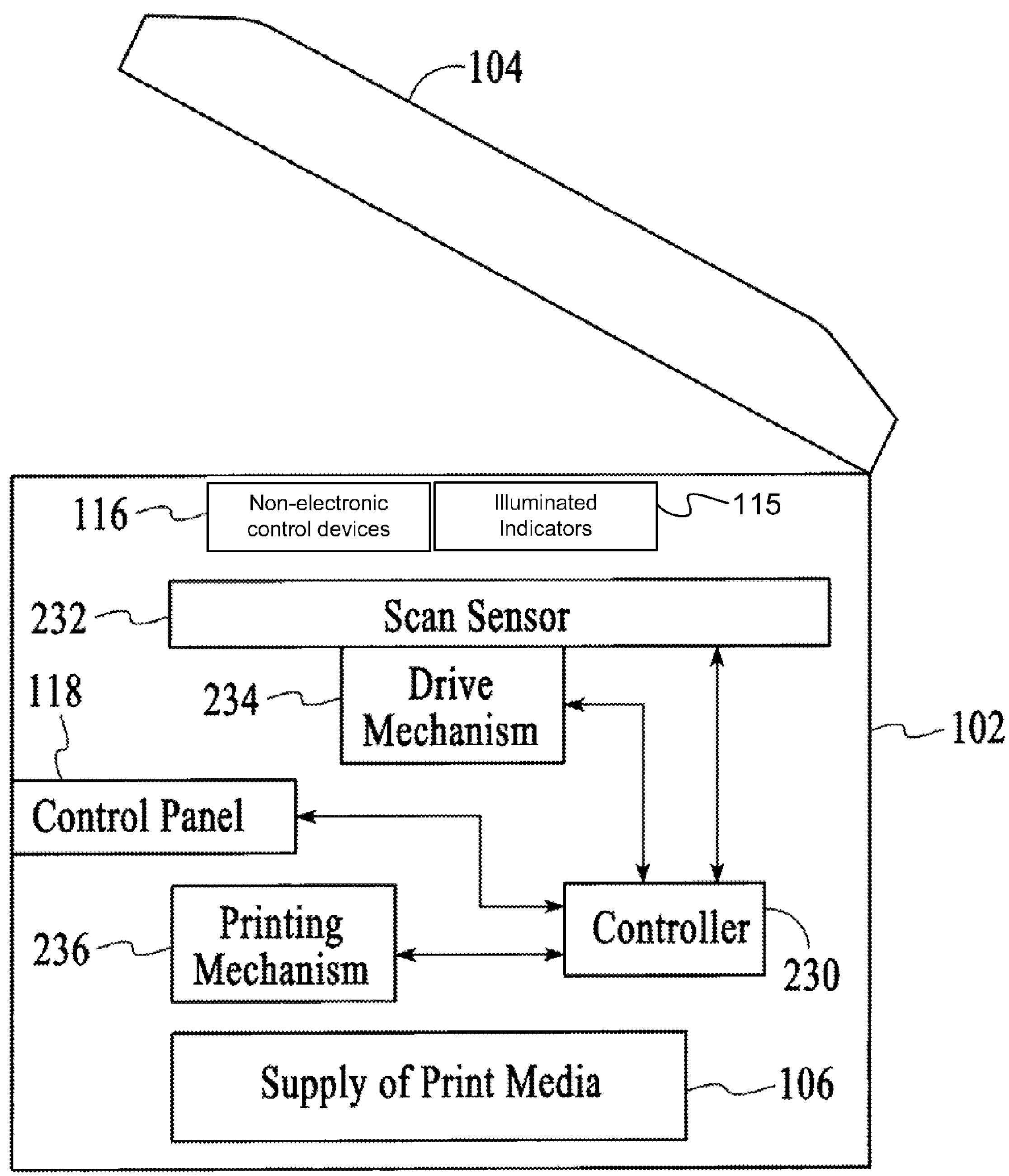
FIG. 2 is a block diagram of the components included in the image forming apparatus of FIG. 1 in accordance an embodiment.

Turning now to FIG. 2, a block diagram of the image forming apparatus 100 is shown. The housing structure 102 houses the internal components of the image forming apparatus 100. The housing structure 102 may be formed of plastic, resin, or any other suitable materials. The components internal to the housing structure 102 include a controller 230, a scan sensor 232, a drive mechanism 234, a printing mechanism 236 and the supply 106 of print media. The controller 230 may also be external to the image forming apparatus 100. For example, the controller 230 may be embodied in a computer coupled to the image forming apparatus 100. The controller 230 is configured to transmit, receive and process signals from various components of the image forming apparatus 100. As described in more detail below, the controller 230 may also determine the current settings of the non-electronic control devices 116 by processing captured images of the non-electronic control devices 116. The controller 230 may further control light source 340 (illustrated in FIGS. 3-5) to illuminate the indicators 115 according to the function of the image forming apparatus 100. The controller 230 can be implemented as one or more processors, such as one or more digital signal processors. Also described in more detail below, the controller 230 sends the appropriate signals to illuminate the illuminated indicators 115. If controller 230 were implemented as more than one digital signal processor, one processor may be dedicated to the non-electronic control devices 116, another dedicated to control of the illumination of the indicators 115, and a third to control the printing, scanning, copying or facsimile algorithms of the image forming apparatus 100.

Further, the controller 230 moves the scan sensor 232 between the scanning region 108 and the user interface region 110 at the appropriate times. For example, the controller 230 may be configured to locate or park the scan sensor 232 user interface region 110 when not in use. When a user initiates a command that involves scanning or when a calibration is needed, controller 230 moves scan sensor 232 away from the parked location. In another example, the controller 230 may be configured to move the scan sensor 232 when the user presses a button or at the next available time after a user presses a button. Additionally, the scan sensor 232 may be placed in standby or sleep more by controller 230, and brought out of standby or sleep mode by pressing an electronic button or switch.

Figure 3:
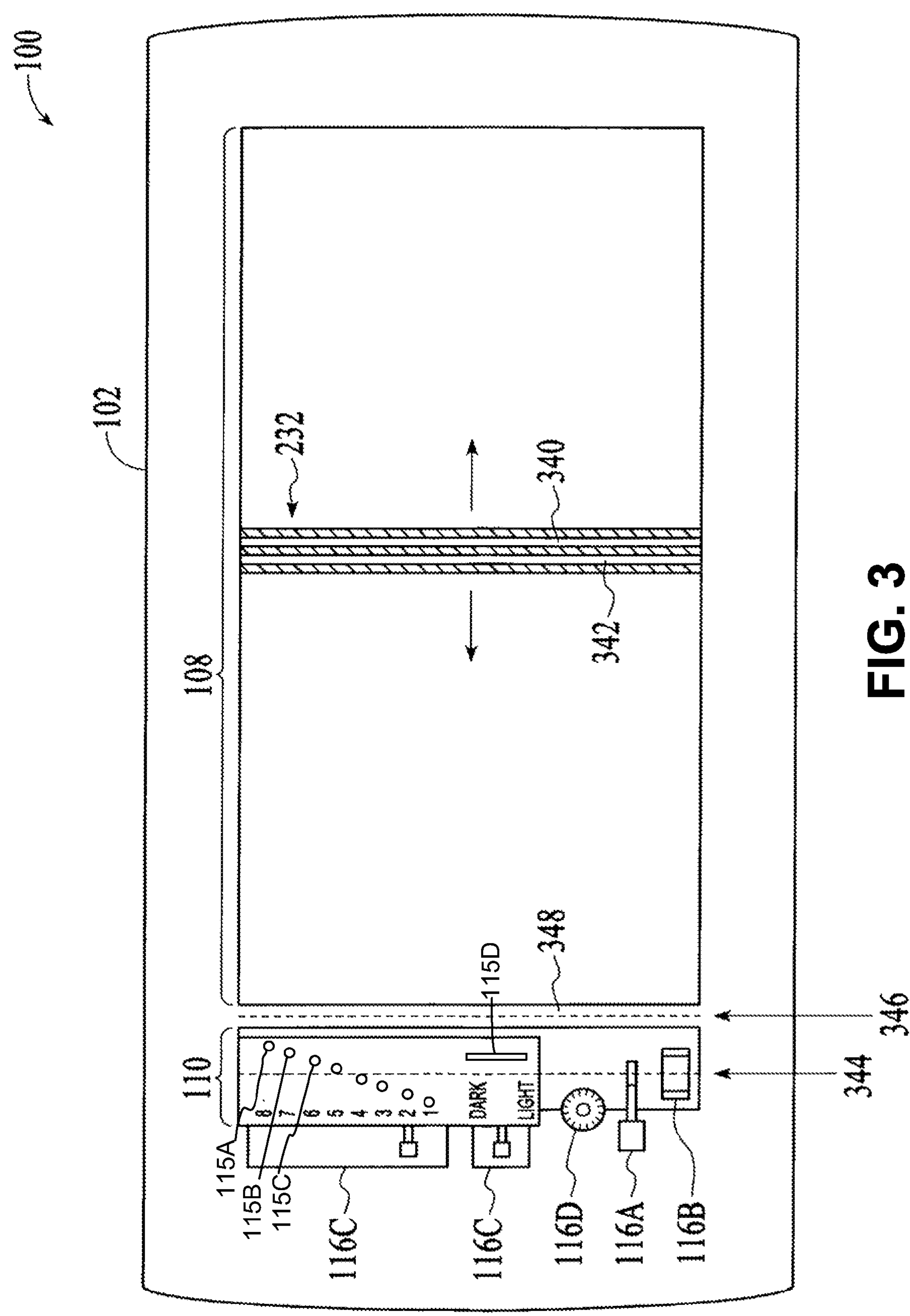
FIG. 3 is top view of the image forming apparatus of FIG. 1 without a scanner lid.

In addition, the user interface region 110 need not be arranged to the left of the scanning region 108, such as depicted in FIGS. 1 and 3. The user interface region 110 could be positioned in a different place, such as to the right of the scanning region 108. Or, the user interface region 110 could be arranged along the top edge or bottom of the scanning region 108. In this arrangement, the scan sensor 232 and light source could be positioned under both the scanning region 108 and the user interface region 110 at the same time.

The scan sensor 232 is configured to electronically capture an image of a target object above the scan sensor 232. As shown in FIG. 1, the scan sensor 232 is positioned in the housing structure 102 below the transparent glass panel 114. The scan sensor 232 is illustrated in more detail in FIG. 3, which is a top view of the image forming apparatus 100 without the scanner lid 104. As shown in FIG. 3, the scan sensor 232 includes a light source 340 and a linear image sensor array 342. In operation, the light source 340 provides linear illumination on a target object above the scan sensor 232, while the linear image sensor array 342 electronically captures a linear image of the target object. Since the image sensor array 342 is linear, the image sensor array 342 captures the image along a scan line, which is parallel to the image sensor array 342. Thus, the current scan line of the scan sensor 232 is dependent on the position of the scan sensor 232. The light source 340 may be a fluorescent lamp, such as a cold cathode fluorescent lamp (CCFL) or a xenon lamp, an array of red (R), green (G) and blue (B) light emitting diodes (LEDs), one or more white LEDs, or any suitable light source. The image sensor array 342 may be a charged coupled device (CCD) array, a contact image sensor (CIS) array or any other type of image sensor array. The scan sensor 232 includes other well known components that are commonly found in a conventional scan sensor. However, for ease of illustration and brevity, these components are neither shown nor described herein.

The scan sensor 232 is connected to the drive mechanism 234, which operates to linearly move the scan sensor in 232 a direction perpendicular to the length of the scan sensor 232 across the scanning region 108 and the user interface region 110 of the image forming apparatus 100, as shown in FIG. 3. The drive mechanism 234 can move the scan sensor 232 so that the scan line of the scan sensor is aligned with a control scan line 344, which is located in the user interface region 110. The control scan line 344 is used to capture images of the non-electronic control devices 116 to determine the current settings of the non-electronic control devices 116. The drive mechanism 234 can also move the scan sensor 232 so that the scan line of the scan sensor 232 is aligned with a calibration scan line 346 in a calibration region, which is located between the scanning region 108 and the user interface region 110. Alternatively, the calibration region may be located on the opposite side of the scanning region 108 as the user interface region 110. In the calibration region, the calibration scan line 346 is used to image a calibration strip 348 to calibrate the scan sensor 232 for imaging operations. The transparent glass panel 114 may extend to the calibration region. The transparent glass panel 114 may provide a reference surface to control the spacing to the scan sensor 232. Further, if the transparent glass panel 114 extends under the user interface region 110, the distance between the non-electronic control device 116 and the scan sensor 232 can be easily and precisely be controlled.

The drive mechanism 234 can also move the scan sensor 232 so that the scan line of the scan sensor 232 is linearly moved across the scanning region 108. Thus, the scan sensor 232 can image an entire target object placed in the scanning region 108. The scan sensor 232 operates to capture images of a target object placed in the scanning region 108 and/or the non-electronic control devices 116 in the user interface region 110 in the form of image data and transmit the image data to the controller 230, where the image data is processed to produce a complete digital image of the target object or to determine the current settings of the non-electronic control devices 116.

The printing mechanism 236 is configured to print the complete digital image of the target object captured by the scan sensor 232 onto a print medium, e.g., a sheet of paper, from the supply 106 of print media. The printing mechanism 236 can also print an electronic file, such as an electronic document or a digital image file, from a computer connected to the image forming apparatus 100. The printing mechanism 236 may include any type of printing technologies. The printing mechanism 236 may use the inkjet method, which controls the size and/or placement of droplets of ink as they are propelled onto a pint medium. The printing mechanism 236 may use electrophotography, in which a laser removes charge from a photoconductive drum such that toner is picked up in the charged areas and transferred to a print medium by at least one of contact, electrical current, or heat. The printing mechanism 236 may use a thermal technique, which heats thermal paper that turns black where it is heated. The printing mechanism 236 may use die-sublimation, which heats dye to transfer an image to a print medium (for example, the dye may be transferred from a ribbon to a print medium that is a plastic card, fabric, or a paper). The printing mechanism 236 may use a wax technique, where transfer ribbon coated with wax is heated to transfer ink to a print medium. Each of the possible printing mechanisms 236 is a common component found in conventional image forming apparatus, and thus, for ease of illustration and brevity, is not described herein in detail.

The illuminated indicators 115 in the user interface region 110 of the image forming apparatus 100 may be arranged in various fashions to correspond to the various functions of the image forming apparatus 100. For example, the states of the image forming apparatus 100 may be conveyed to the user. States of the image forming apparatus 100 include, for example, power, standby, and error. In combination or as another example, the mode of the AOI or MFP type of image forming apparatus 100 may be conveyed to the user. Modes of the image forming apparatus 100 include printer mode, photocopier mode, scanner mode, and facsimile mode. Further, output selections may be conveyed to the user. Output selections include contrast, magnification, resize, paper size, and paper type. In combination or as another example, post processing selections may be conveyed to the user. Post processing selections include stapling, hole punching, and collating. Additionally, the illuminated indicators 115 may convey the number of copies selected or any other selection or function of the image forming apparatus 100, such as clear.

As further shown by FIG. 3, the illuminated indicators 115 may take any shape. For example illuminated indicators 115A-C are elliptical, while illuminated indicator 115D is rectangular and configured to show a sliding scale. In order to show the number of copies, selected illuminated indicators 115 may be placed adjacent to a sliding selector 116C. As shown in FIG. 3 the sliding selector 116C may be moved between any number of copies, which in this particular example any number from one copy to eight copies, and illuminate indicator 115A corresponds to eight copies, illuminated indicator 115B corresponds to seven copies, and illuminated indicator 115C corresponds to six copies and so on.

Because illuminated indicators 115A-C are staggered in the moving direction of scanning sensor 232 and light source 340, it is possible to illuminate one of illuminated indicators 115A-C based on the location of the light source 340.

The non-electronic control devices 116 in the user interface region 110 of the image forming apparatus 100 may include any combination of non-electronic buttons, non-electronic switches, non-electronic sliding selectors and non-electronic rotary dials. As an example, the user interface region 110 may include a non-electronic button 116A, a non-electronic switch 116B, two non-electronic sliding selectors 116C and a non-electronic rotary dial 116D, as shown in FIG. 3. In this example, the button 116A and the switch 116B are used to activate the scan and copy processes, respectively.

Moreover, one of the sliding selectors 116C is used to set the number of copies, while the other sliding selector 116C is used to set the contrast. The rotary dial 116D is used to set the scaling option. In other embodiments, the image forming apparatus 100 may include other types of non-electronic control devices, each being configured to display or represent a target undersurface, which can be imaged to determine the current setting of that non-electronic control device. The target undersurface may have a particular pattern that enables easy capturing and interpretation. The pattern may be printed, molded, or affixed to the undersurface. The pattern may be, for example, a plus ("+") or any other shape.

The operation of the non-electronic control devices 116 of the image forming apparatus 100 in accordance with an embodiment is now described. When the image forming apparatus 100 is not actively performing a scanning process, the scan sensor 232 may be parked below the user interface region 110 such that the scan line of the scan sensor 232 is aligned with the control scan line 344. At this parked position, the scan sensor 232 is activated to capture an image, i.e., image data, along the control scan line 344. In an embodiment, the light source 340 of the scan sensor 232 is used to provide illumination for capturing the image. As an example, if the light source 340 of the scan sensor 232 is a fluorescent lamp, then the fluorescent lamp is turned on to capture the image. As another example, if the light source 340 of the scan sensor 232 is an array of red (R), green (G) and blue (B) LEDs, all the LEDs of the array are turned on to capture the image. In an alternative embodiment, only LEDs of a particular color may be used to provide illumination for capturing the image or the LEDs of each color may be used in sequence to provide illumination for capturing the image. As an example, the particular color LEDs to be used for illumination may be chosen based on the material color of the target undersurfaces, for which the non-electronic control devices 116 will produce the best contrast.

Figure 4:
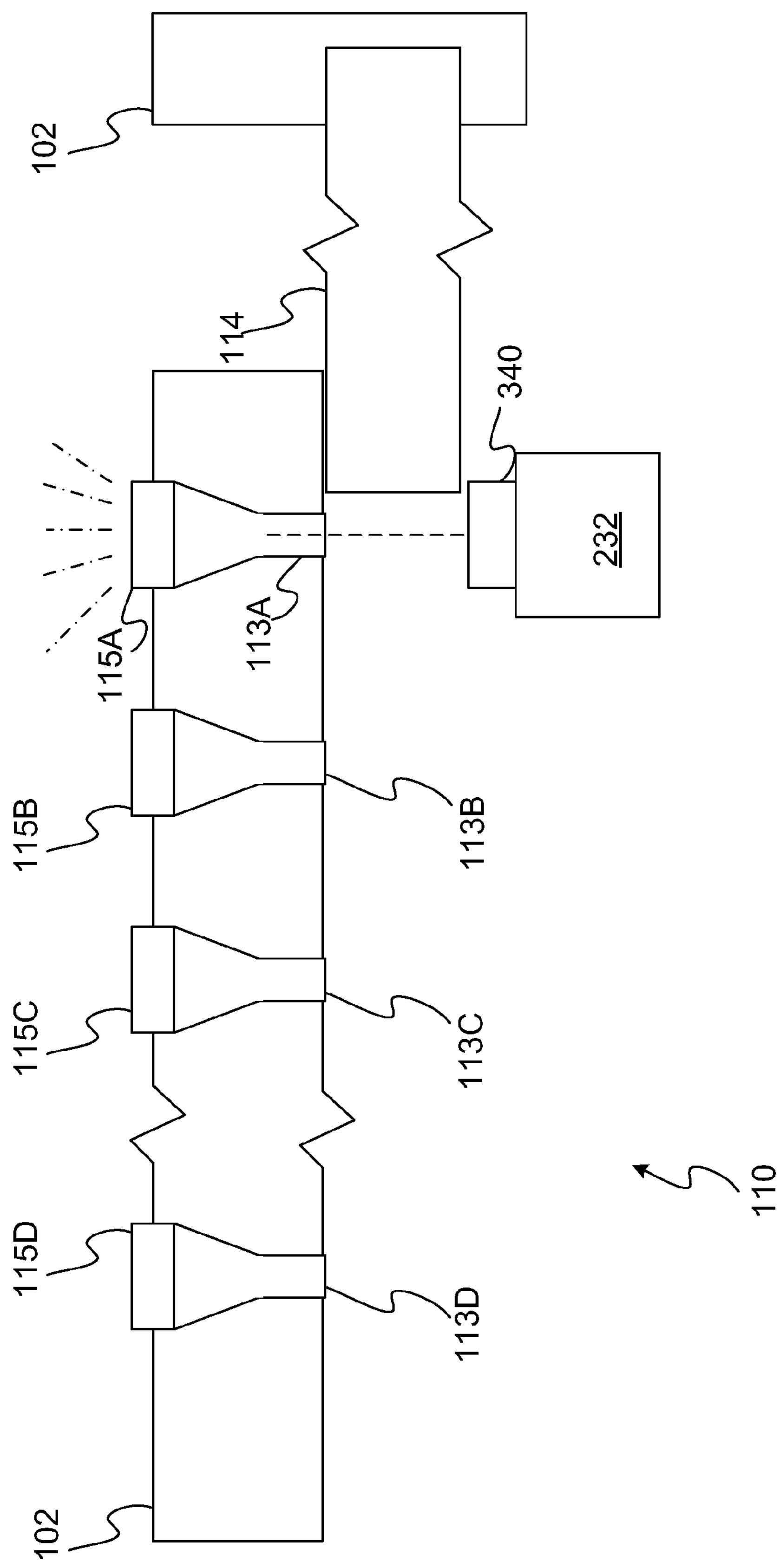
FIG. 4 is a cross-sectional side view of the user interface of FIG. 3.
Figure 5:
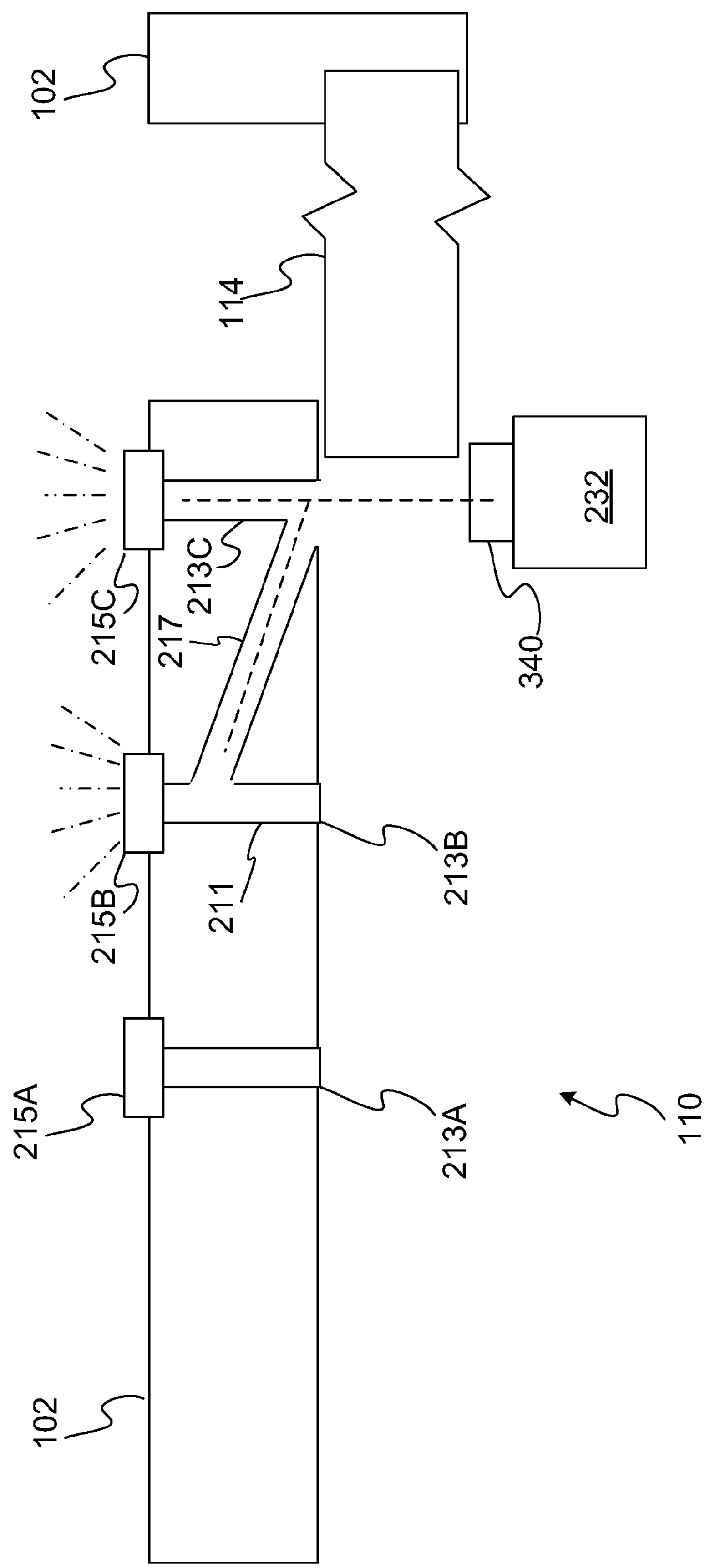
FIG. 5 is a cross-sectional side view of an embodiment of the user interface region.

FIG. 4 is a cross-sectional view of the user interface region 110 of FIG. 3, positioned between the housing 102 and the glass panel 114. In this view, the arrangement of the illuminated indicators 115A-D in the moving direction of the light source 340 can be better appreciated. At the particular time shown in FIG. 4, illuminated indicator 115A is aligned with the light source 340 and therefore only illuminated indicator 115A will be illuminated. Diffusing lens 113A is a light conveying member coupled to the illuminated indicator 115A that is operable to receive light from the light source 340. The shape, size, and orientation of lenses 113A-D is merely a graphical representation of the lenses. As shown in FIG. 3, indicator 115A corresponds to a selection of eight copies. Likewise, if controller 230 were to position the scan sensor 232 and light source 340 under any of the other illuminated indicators, other information could be conveyed to the user. If light source 340 were positioned under one of the indicators 115B, 115C, or 115D, diffusing lenses 113B, 113C, or 113D may serve as a light conveying member coupled to the corresponding illuminated indicator that is operable to receive light from the light source. In another embodiment, holes in the housing 102 could be used instead of lenses. However, diffusing lenses 113 may preferably protect the user from the bright light of the light source 340. The indicators 115A-C may be patterned or textures to disperse light and increase the viewing angle Referring to FIG. 5, a cross-sectional view of an embodiment of user interface region 110 is shown. User interface region 110 is positioned between the housing 102 and the glass panel 114. Illuminated indicators 215A-C are arranged in a pattern along the moving direction of scan sensor 232 and light source 340. A single position of the light source 340 can illuminate more than one of the illuminated indicators 215A-C. For example, a light guide or light pipe may be used to convey the light in something other than a straight line. FIG. 5 illustrates light pipes 213A-C. Light pipe 213B is composed of a first leg 211 and a second leg 217.

Light pipe 213B conveys light from the light source 340 to indicator 215B even when the light source 340 is positioned under indicator 215C. Light pipe 213B is another example of a conveying member coupled to the illuminated indicator operable to receive light from light source 340. In the particular example shown, light pipes 213A and 213C, which are additional conveying members, convey light in a straight direction but could also be configured to convey light from the light source 340 at another position of the scan sensor 232 and light source 340.

Further, each of the first leg 211 and the second leg 217 includes an entry point for the light. Therefore, light pipe 213B comprises a plurality of entry points. Additionally, light pipe 213B may have a different length than light pipes 213A and 213C. The different length may affect the intensity of the light at the illuminated indicator. It may desirable to a longer light pipe thicker at least near the light source 340 so that more light may be collected. Light pipes or light guides 213 may be formed of resin, plastic, acrylic resin, glass, optical fiber, or any other suitable transparent or semi-transparent material. The light pipes or light guides 213 are polished to form entry points or exit points.

Figure 6:
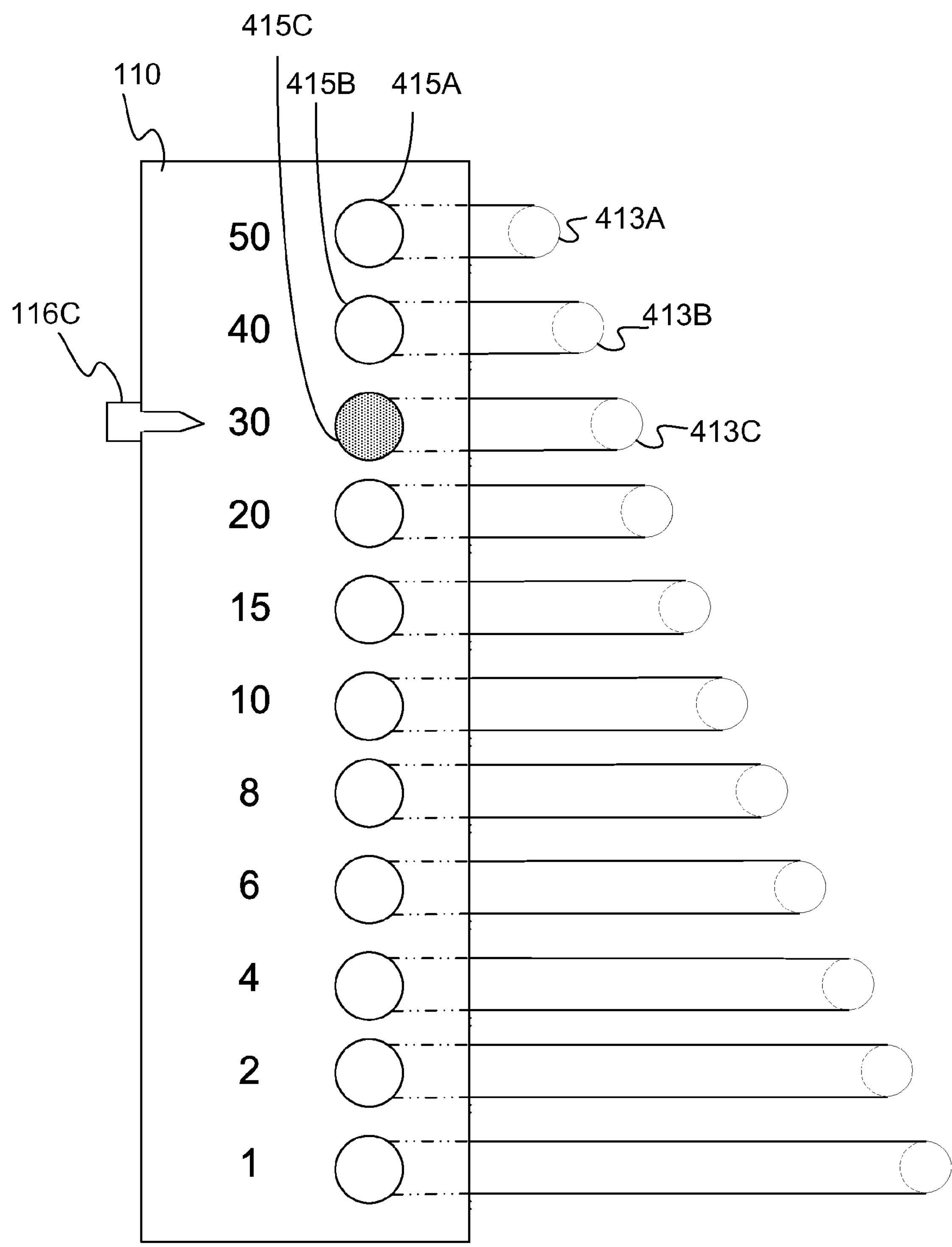
FIG. 6 is a top view of a user interface region of an embodiment of the image forming apparatus.

FIG. 6 is a top view of an embodiment of the user interface region 110. In the particular example shown, sliding selector 116C sets the number of copies. The selector 116C may be configured to select any number of copies or the selector may be configured to permit only the most common choices users prefer for the number of copies. Illuminated indicators 415 are arranged in a straight line. Each of the illuminated indicators 415 may be coupled to a light conveying member and operable to receive light from light source 340. For example, illuminated indicator 415A is coupled to light pipe or light conveying member 413A, illuminated indicator 415B is coupled to light pipe or light conveying member 413B, and illuminated indicator 415C is coupled to light pipe or light conveying member 413C. As shown in FIG. 6, the entry points of the light pipes 413 are staggered in the moving direction of scan sensor 232 and light source 340. In other words, light pipes 413 have different lengths so that each of the light pipes 413 receives light from the light source 340 and different positions of the light source 340 and scan sensor 232.

In addition, the user interface region 110 may include a configuration similar to that shown in FIG. 6 that indicates the number of copies remaining. After the image forming apparatus 100 scans the object and is making copies, the light source 340 is no longer needed for scanning. The controller 230 may return the light source 340 to the user interface region 110 where it may display to the user a real time update of the remaining number of copies.

Figure 7:
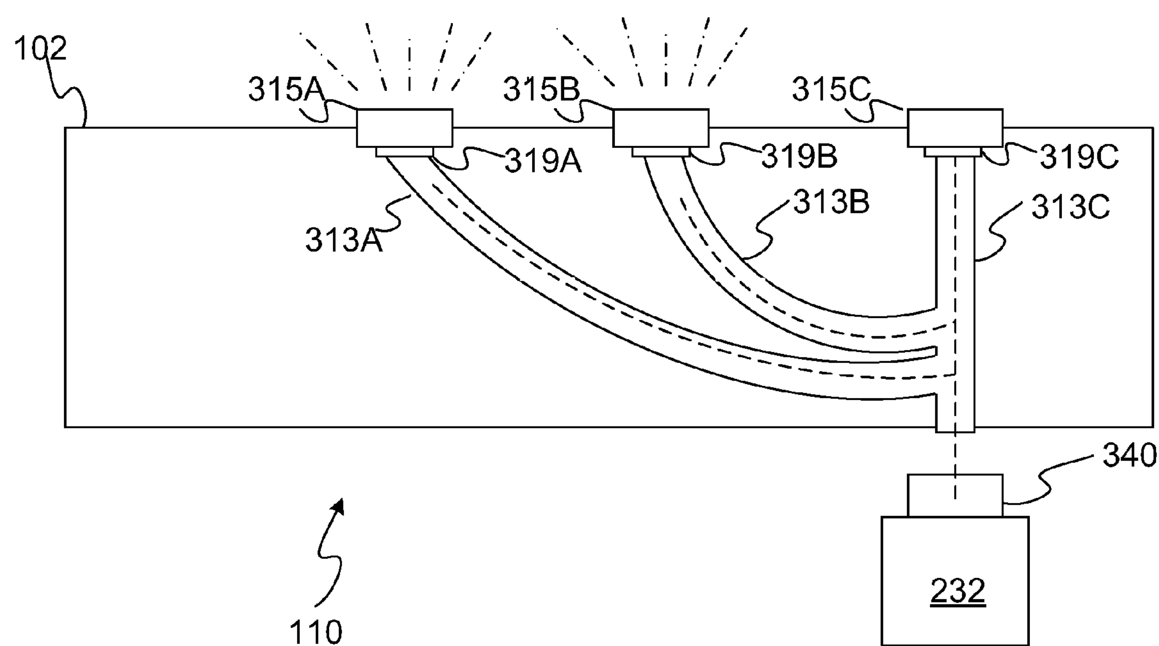
FIG. 7 is a cross-sectional side view of an embodiment of the user interface region.

Referring to FIG. 7, a cross-sectional view of an embodiment of the user interface region 110 is shown. The user interface region 110 is positioned between the housing 102 and the glass panel 114. Illuminated indicators 315A-C are arranged on the user interface region 110. Light guide 313 includes a first leg 313A, a second leg 313B, and a third leg 313C as light conveying members coupled to the illuminated indicators 315 operable to receive light from light source 340. Filters 319 are positioned between the illuminated indicators 315 and the legs of light guides 313. The filters 319 may provide greater flexibility with the design of the user interface region 110. In the particular example shown in FIG. 7, filter 319A is a red transmissive filter, filter 319B is a green transmissive filter, and filter 319C is a blue transmissive filter. When an array of red (R), green (G) and blue (B) light emitting diodes (LEDs) is used for light source 340, lighting only the red LED(s) would illuminate only indicator 315A, lighting only the green LED(s) would illuminate only indicator 315B, and lighting only the blue LED(s) would illuminate only indicator 315C. All three indicators 315A-C could be illuminate at once by lighting all three colors of LED(s). Even though light guide 313 optically connects all of illuminated indicators 315A-C, filters 319 control lighting of the illuminated indicators 315A-C one at a time. In addition, by using any combination of red, green and blue LEDs, any two of the illuminated indicators 315 could be illuminated. In the instance shown in FIG. 7, indicators 315A and 315B have been illuminated but indicator 315C has not been illuminated. These techniques may be used to illuminate a status indicator that would be green for ready, yellow for busy, and red if there is an error. Errors may include a paper jam or a low/empty supply of ink or toner.

Figure 8:
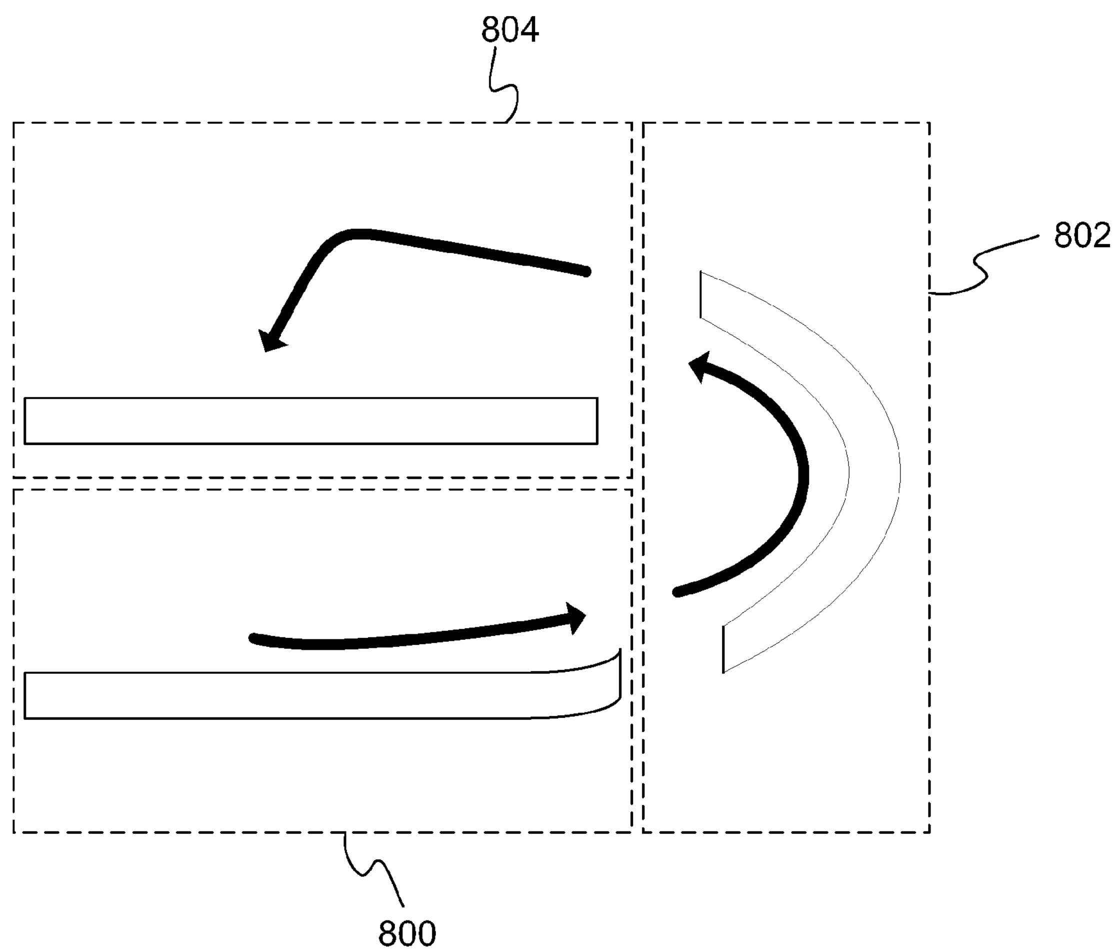
FIG. 8 is an example of an animation displayed by the user interface region.

FIG. 8 is a representation of an animation that may be realized by using user interface region, light guide, and filters similar to that shown by FIG. 7. By lighting the red LED(s), green LED(s), and blue LED(s) in a sequence, each of the first phase 800, second phase 802, and third phase 804 may be illuminated in sequence. In other words, a first illuminated indicator, a second illuminated indicator, and a third illuminated indicator may be arranged in a predetermined pattern that provides the perception of an animation. In particular, the controller 230 may sequentially control the light source 340 to light the red LEDs first, the green LEDs second, and the blue LEDs third. The sequence of the colors may be in any order. Alternatively, animation could also be shown using light guides or light pipes, as described above, so that in a first position the light source 340 would illuminate the first phase 800, in a second position the light source 340 would illuminate the second phase 802, and in a third position the light source 340 would illuminate the third phase 804. In other words, the controller 230 may position the light source 340 and scan sensor 232 in a first position thereby causing illumination of the first phase 800, a second position to illuminate the second phase 802, and a third position to illuminate the third phase 804. The phases may be illuminated in any sequence. The animation shown in FIG. 8 illustrates a paper path, which could be used to indicate status or a paper jam location. The animation could provide the user with instructions or operating or troubleshooting the image forming apparatus.

Figure 9:
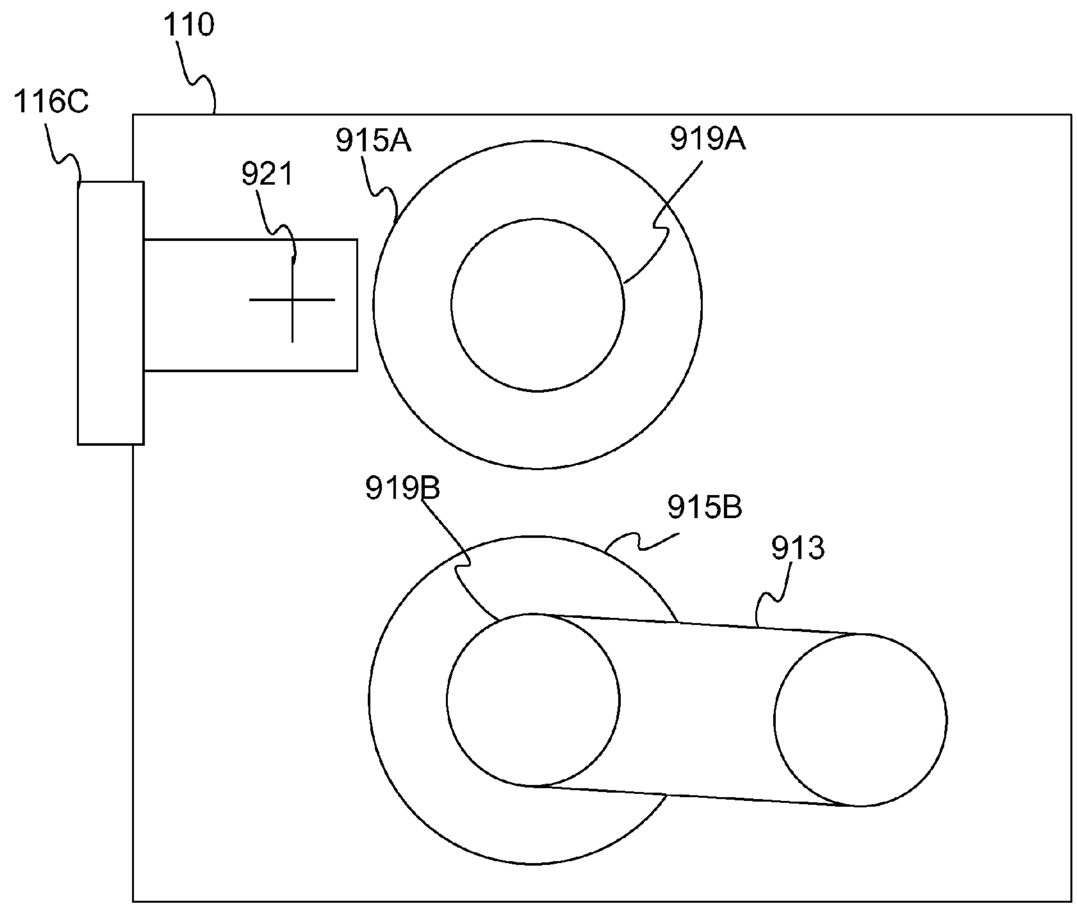
FIG. 9 is an undersurface view of an embodiment of an exemplary user interface region.

FIG. 9 is an undersurface view of user interface region 110. FIG. 9 illustrates how the scan sensor 232 and light source 340 could be parked in a single position and perform both the functions of determining the settings of the non-electronic control devices 116 and illuminating indicators 115 to convey information to the user. Sliding selector 116C is a non-electronic control device, which is shown in FIG. 9 in a position corresponding to illuminated indicator 915A. The undersurface of sliding selector 116C includes a pattern that enables easy capture by the scan sensor 232 and easy interpretation by the controller 230. The pattern may be printed, molded, or affixed to the undersurface. The pattern may be, for example, a plus ("+") or any other shape. In the example shown in FIG. 9, the pattern is a cross. Further, the color or texture of the undersurface may be used may be used to detect a significant difference contract to the background.

Sliding selector 116C may be moved to correspond to illuminated indicator 915B. Filter 919A is coupled to indicator 915A and filter 919B is coupled to indicator 915B. Light guide or light pipe 913 allows indicator 915B to be positioned in line with indicator 915A but to be illuminated by a slightly different position of the light source. Filters 919A and 919B do not pass blue light but do pass red light and green light. In other words, the filters 919A and 919B are red and green transmissive filters, respectively.

When the blue LEDs from the light source are lit, no light will pass to the indicators 915, but the blue light from the blue LEDs may still be used to determine the settings of the non-electronic control device (sliding selector 116C). Further, illuminator indicator may be illuminated in either red (e.g., indicating an error) or green (e.g., indicating power or online) or any other color.

Figure 10:
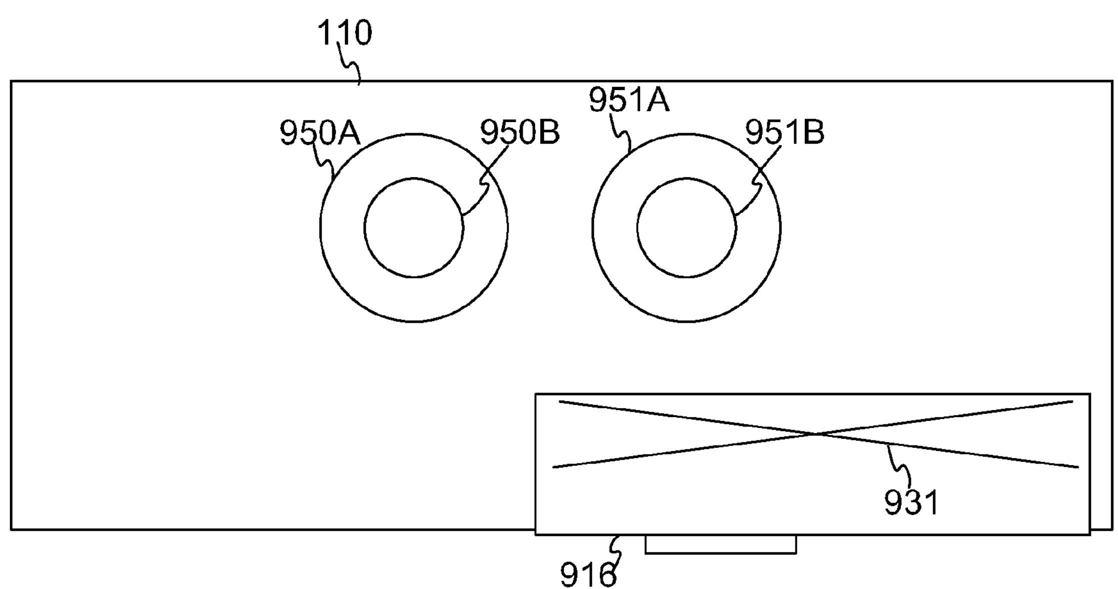
FIG. 10 is an undersurface view of an embodiment of another exemplary user interface region.

FIG. 10 is an undersurface view of another embodiment of the user interface region of the image forming apparatus. FIG. 10 illustrates another example of how the scan sensor 232 and light source 340 could be parked in a single position and perform both the functions of determining the settings of the non-electronic control devices 116 and illuminating indicators 115 to convey information to the user. An elongated sliding selector 916 is located near the lower portion of the user interface region 110. The scan sensor 232 may capture the location of the sliding selector 116C across a wider range and simultaneously illuminate indicators 950A and 951A, which are spaced apart. The sliding selector 916 may also include a pattern 931 that varies in a horizontal direction which allows the controller 230 to determine the location of the sliding selector 916 regardless where along the sliding selector 916 the scan sensor 232 is located. The example of FIG. 10 may also include filters 950B and 951B.

Although specific embodiments of the invention have been described and illustrated, the invention is not to be limited to the specific forms or arrangements of parts so described and illustrated. The scope of the invention is to be defined by the claims appended hereto and their equivalents. It is intended that the foregoing detailed description be understood as an illustration of selected forms that the invention can take and not as a definition of the invention. It is only the following claims, including all equivalents, that are intended to define the scope of this invention.

What is claimed is:

1. An image forming apparatus comprising:
- a scanning region;
- a user interface region adjacent to the scanning region;
- an illuminated indicator in the user interface region corresponding to a function of the image forming apparatus;
- a light source operable to illuminate an object in the scanning region; and
- a light conveying member coupled to the illuminated indicator and operable to receive light from the light source, wherein the light from the light source conveys information to a user through the illuminated indicator.

2. The image forming apparatus of claim 1, further comprising:
- a scan sensor operable to capture an image of the object; and
- a calibration region located between the scanning region and the user interface region, wherein the calibration region is used to calibrate the scan sensor.

3. The image forming apparatus of claim 1, wherein the light source comprises a white light emitting diode.

4. The image forming apparatus of claim 1, wherein the light source is an array of red, green, and blue light emitting diodes.

5. The image forming apparatus of claim 1, wherein the light conveying member comprises a diffusing lens.

6. The image forming apparatus of claim 1, wherein the light conveying member comprises a light pipe.

7. The image forming apparatus of claim 6, wherein the light pipe comprises a plurality of entry points.

8. The image forming apparatus of claim 6, further comprising:
- a filter between the light conveying member and the illuminated indicator.

9. The image forming apparatus of claim 1, wherein the light conveying member is a first light conveying member and the illuminated indicator is a first illuminated indicator, the image forming apparatus further comprising:
- a second light conveying member coupled to a second illuminated indicator and operable to receive light from the light source.

10. The image forming apparatus of claim 9, wherein the length of the second light conveying member is greater than the length of the light conveying member.

11. The image forming apparatus of claim 9, further comprising:
- a third light conveying member coupled to a third illuminated indicator and operable to receive light from the light source;
- a red transmissive filter coupled to the first light conveying member;
- a blue transmissive filter coupled to the second light conveying member; and
- a green transmissive filter coupled to the third light conveying member.

12. The image forming apparatus of claim 11, wherein the illuminated indicator, the second illuminated indicator, and the third illuminated indicator are arranged in a predetermined pattern that provides an animation when sequentially driven.

13. The image forming apparatus of claim 1, wherein the function of the image forming apparatus comprises at least one of power, standby, error, number of copies, contrast, paper supply level, magnification, stapling, collating, printer mode, photocopier mode, scanner mode, facsimile mode, paper size, resize, start, and clear.

14. The image forming apparatus of claim 2, further comprising:
- a non-electronic control device manually movable in the user interface region to a position indicative of a setting;
- wherein the scan sensor is configured to capture an image of at least a portion of the non-electronic control device and a controller configured to determine the setting of the non-electronic control device based on the image.

15. The image forming apparatus of claim 14, wherein the non-electronic control device comprises at least one of a sliding arm, a rotary dial or a button, wherein the non-electronic control device has an undersurface including a pattern that is used to identify a position of the non-electrical control device.

16. The image forming apparatus of claim 14, wherein the scan sensor is configured to capture an image of the non-electronic control device at a same position that the light source transmits light to the illuminated indicator.

17. A method of conveying information to a user of an image forming apparatus, comprising:
- scanning an object in a scanning region using a light source;
- conveying light from the light source to an indicator in a user interface region adjacent to the scanning region;

illuminating the indicator using the light source thereby indicating a function of the image forming apparatus;

receiving a user input via a non-electronic control device comprising a setting corresponding to a position of the non-electronic control device;

obtaining an image of at least a portion of the non-electronic control device; and processing the image to determine the setting of the non-electronic control device.

18. The method of claim 17, further comprising:

capturing an image of the object using a scan sensor; and calibrating the scan sensor in a calibration region between the scanning region and the user interface region.

19. The method of claim 17, wherein conveying light from the light source includes guiding the light with a light pipe.

20. An image forming apparatus comprising:

a scanning region;

a user interface region adjacent to the scanning region;

an illuminated indicator corresponding to a function of the image forming apparatus;

a light source operable to illuminate an object in the scanning region;

a light conveying member operable to receive light from the light source; and a second light conveying member operable to receive light from the light source, wherein the length of the second light conveying member is greater than the length of the light conveying member.

* * * * *